United States Patent [19]
Olsen et al.

[11] Patent Number: 5,510,178
[45] Date of Patent: Apr. 23, 1996

[54] TRANSFER ARTICLE FOR FORMING TETROREFLECTIVE AND COLORED IMAGES AND METHOD OF MAKING SAME

[75] Inventors: Ulf N. Olsen, Solbergmoen, Norway; Erik Franke, Copenhagen, Denmark; Eilif Strand, Drammen, Norway

[73] Assignee: Minnesota Mining and Manufacturing Company, St. Paul, Minn.

[21] Appl. No.: 39,454

[22] PCT Filed: Oct. 25, 1991

[86] PCT No.: PCT/DK91/00325

§ 371 Date: Jun. 23, 1993

§ 102(e) Date: Jun. 23, 1993

[87] PCT Pub. No.: WO92/07990

PCT Pub. Date: May 14, 1992

[30] Foreign Application Priority Data

Oct. 25, 1990 [DK] Denmark .................. 2573/90

[51] Int. Cl.⁶ .................................. B32B 5/16
[52] U.S. Cl. .................. 428/323; 428/195; 428/411.1; 428/423.7; 428/474.4; 428/488.4; 428/914
[58] Field of Search ........................ 428/325, 241, 428/429, 448, 451, 323, 195, 411.1, 423.7, 474.4, 488.4, 914; 156/230, 234, 155

[56] References Cited

U.S. PATENT DOCUMENTS

| | | | |
|---|---|---|---|
| 2,143,946 | 1/1939 | Hunter | 41/36 |
| 2,407,680 | 3/1945 | Palmquist et al. | 88/82 |
| 2,422,256 | 6/1947 | Phillippi | 40/135 |
| 2,543,800 | 3/1951 | Palmquist et al. | 88/82 |
| 2,555,715 | 6/1951 | Tatum | 88/82 |
| 2,567,233 | 9/1951 | Palmquist et al. | 88/82 |
| 2,592,882 | 4/1952 | Fisher et al. | 88/82 |
| 3,535,019 | 10/1970 | Longlet et al. | 350/105 |
| 3,551,025 | 12/1970 | Bingham et al. | 350/105 |
| 3,614,199 | 10/1971 | Altman | 350/105 |
| 3,700,305 | 10/1972 | Bingham | 350/105 |
| 3,758,192 | 9/1973 | Bingham | 350/105 |
| 3,836,227 | 9/1974 | Holmen et al. | 350/105 |
| 3,877,786 | 4/1975 | Booras et al. | 350/105 |
| 4,102,562 | 7/1978 | Harper et al. | 350/105 |
| 4,153,412 | 5/1979 | Bailey | 8/2.5 A |
| 4,234,643 | 11/1980 | Grotefend et al. | 428/200 |
| 4,546,042 | 10/1985 | Quon | 428/378 |
| 4,605,461 | 8/1986 | Ogi | 156/233 |
| 4,634,220 | 1/1987 | Hockert et al. | 350/167 |
| 4,656,072 | 4/1987 | Coburn, Jr. et al. | 428/40 |
| 4,721,649 | 1/1988 | Belisle et al. | 428/325 |
| 4,980,216 | 12/1990 | Rompp | 428/90 |

FOREIGN PATENT DOCUMENTS

| | | | |
|---|---|---|---|
| 153676 | 8/1988 | Denmark | B32B 27/04 |
| 155888 | 11/1988 | Denmark | D06Q 1/00 |
| 63-233107 | 9/1988 | Japan | E01F 9/00 |
| 64-38277 | 8/1989 | Japan | B41M 3/12 |
| 1303103 | 1/1973 | United Kingdom . | |
| WO79/01146 | 12/1979 | WIPO | B32B 27/40 |
| WO80/00462 | 3/1980 | WIPO . | |
| WO88/08793 | 11/1988 | WIPO . | |

OTHER PUBLICATIONS

Nylobag NB One/Two–pack Screen Inks product information.

Nylotex NX One/Two–Pack Screen Inks product information.

*Primary Examiner*—Patrick J. Ryan
*Assistant Examiner*—William Krynski
*Attorney, Agent, or Firm*—Gary L. Griswold; Walter N. Kirn; Karl G. Hanson

[57] ABSTRACT

A transfer with durable images comprising a support sheet having a monolayer of transparent microspheres that are partially embedded in the support sheet with a specularly reflecting layer covering the parts of the surfaces of the microspheres which are exposed above the support sheet. One or more coatings of two-component colors can be printed imagewise on top of the layer of microspheres. The two-component colors are based on polyester resin and an isocyanate hardener.

12 Claims, 1 Drawing Sheet

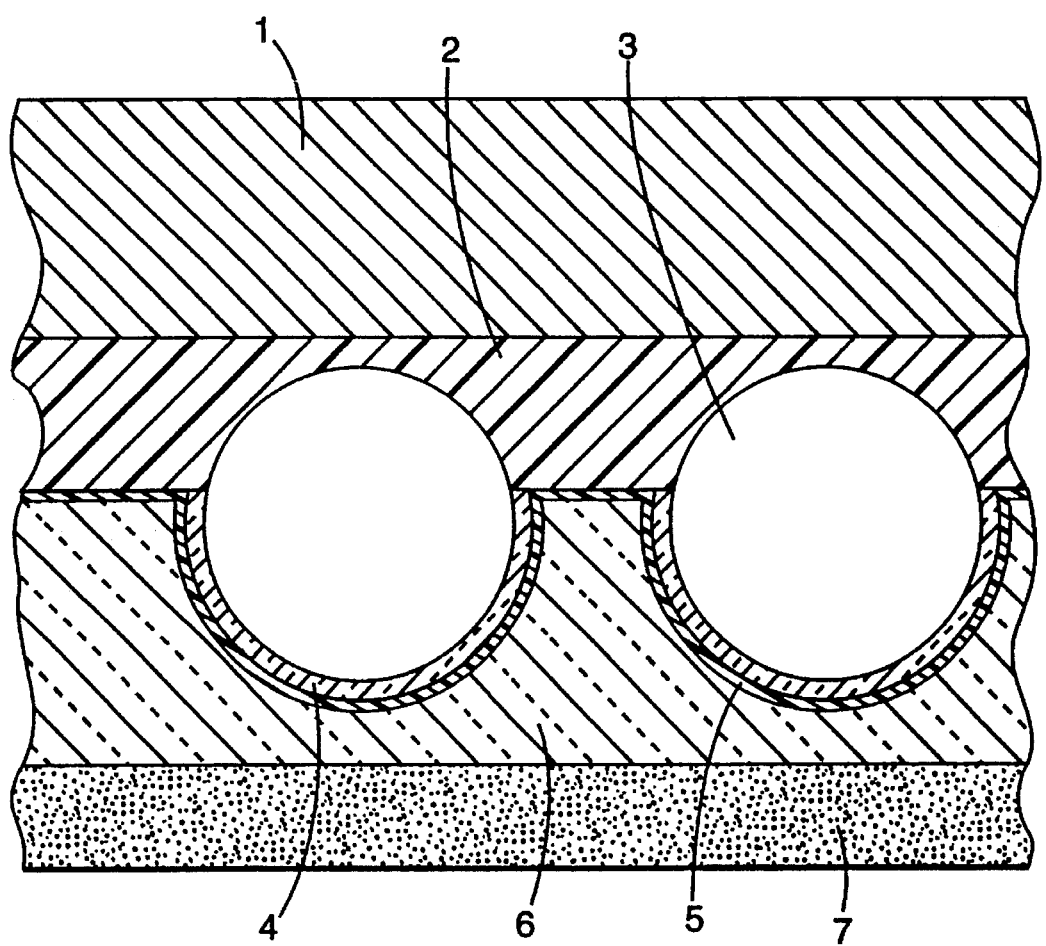

TRANSFER ARTICLE FOR FORMING TETROREFLECTIVE AND COLORED IMAGES AND METHOD OF MAKING SAME

This invention concerns a transfer for decorating surfaces, preferably textiles or other flexible materials, with images being extremely durable and capable of standing both hot water wash and dry cleaning. In particular the invention concerns a transfer for decorating surfaces with images comprising light-reflecting areas of any configuration and color in arbitrary combination with colored non-reflecting areas. The invention also relates to a process of making such transfer.

It is known to decorate textiles by printing patterns in various colors by a suitable printing method, e.g. the silk screen process. For such patterns to be durable in use and to have good fastness to repeated washing, it is important that the inks used for the printing have good adhesion and cannot be peeled or picked off, that they are elastic so as to be capable of following the expansion and contraction of the substrate, and that they do not crackle or flake.

So-called plastisol inks have been developed for this purpose, based on elastomeric resins, often modified polyvinyl chloride (PVC), dissolved in high-boiling organic solvents. These plastisol inks, which are also called gum printing inks, can be given all possible shades by pigmentation.

It is also known to produce so-called transfers by means of these plastisol inks, i.e. by printing a given pattern in mirror-inverted fashion on a suitable substrate, preferably silicone or wax treated paper. The pattern may then be transferred by the user, e.g. a textile factory, from such a transfer to the textile by application of heat, i.e. the transfer is placed with the inked side against the textile and heated to 130° to 200° C., generally 160° to 180° C., under a pressure of 100° to 800 kPa, generally about 500 kPa, for 10 to 30 seconds, generally 15 to 20 seconds. The temperature, pressure and treatment time used depend, of course, upon the Type and nature of the textile fabric and upon the plastisol type applied, but generally higher temperatures will involve treatment for a shorter period of time, and vice versa.

The international patent application published as WO 80/00462 describes a method of applying a metallised and/or pigmented decoration to a surface, for example a garment surface, comprising the steps of first providing a conventional ink transfer having the form of the intended decoration, and transferring the image therefrom to the surface in conventional manner by application of heat and pressure, and then superimposing a foil having a metallised and/or pigmented coating to the said image, subjecting the foil to heat and/or pressure to cause it to adhere to the image, and peeling off the foil thereby to provide a metallised or pigmented cover adhering to the image and being coextensive therewith. The metallised or pigmented coating on the foil may optionally be provided with a layer of heat or pressure sensitive adhesive on the face intended for application to the image, being so selected as to have an affinity for the material of the image and a disaffinity for the surface to which the image is applied. The metallised and/or pigmented coating may also include a cover layer on the face opposite the face intended for application to the image. But in any case this so-called "hot split" method only aims at applying a metallised and/or pigmented coating to the entire surface of an image being already transferred conventionally from a known transfer.

It is further known to produce so-called retro-reflecting films with a great light reflecting capacity for application on e.g. textiles, first and foremost for security reasons. These retro-reflecting films or reflex films come in two main types, one with a very large number of fine glass beads with a high refractive index embedded with a reflecting substrate in a base sheet (glass bead type), and another formed with a large number of prisms in a sheet. Both types may be formed with the glass beads or the prisms exposed in the surface (open type) or enclosed in a transparent layer (semi-open type) or coated with an optionally inked layer (closed type), or finally encapsulated in closed cavities with entrapped air (capsule type). The reflex films may be formed as reflex transfer films with a heat-activated adhesive intended for i.e. heat application to textiles. Reflex transfer films of the glass bead type may moreover be produced in a very elastic material, which makes them particularly suitable for application to flexible materials.

It is known from i.e. US patent specification No. 3 836 227 to produce such a retro-reflecting film of the glass bead type by embedding a monolayer of glass microspheres having diameters between about 40 and 80 µm to a depth of about 40% of their diameter in a carrier sheet consisting of a polyethylene coating on a paper liner with heating of the polyethylene to about 140° C. A transparent specular coating of zinc sulfide having a thickness of one-quarter the wave length of white light is vapor-coated onto the exposed surfaces of the microspheres, whereafter the exposed glass microspheres are coated with an aqueous dispersion of a binder material comprising a thermoplastic heat-activatable adhesive copolymer of ethylene, vinyl-chloride and acryl amide and optionally a further thermoplastic heat-activatable adhesive copolymer of methyl methacrylate, ethyl acrylate and methacrylic acid in sufficient thickness to leave a dried layer which completely covers the microspheres. The layer is dried at 93° C. for 10 min. Optionally, a second layer comprising a thermoplastic heat-activatable adhesive copolymer based on acrylic acid and an acrylic acid ester may be applied. The resulting sheet material may be adhered onto a substrate, such as cardboard, by placing the exposed surface of the binder layer against the cardboard, and then passing the combination momentarily between hot lamination rolls heating the interface of the binder layer and cardboard to 120–132° C. When the laminate has been cooled to room temperature the polyethylene-coated carrier sheet is stripped away.

It has been a significant drawback in the use of the known reflex transfer films that when applying the reflecting figures and signs, e.g. in the form of letters (words, messages) and logos it has been necessary to punch or cut out each individual letter/figure and apply them manually. Even though substantial funds have been invested in computer controlled cutting machines it has been necessary to remove the excess material around and in the letters manually, which is both labour demanding and entails heavy material loss. It is another drawback that previously it has only been possible to produce single-colored lengths of reflex transfer films. True, it is known to print a reflex transfer film with transparent color over the glass bead surface to obtain various patterns and light effects, but this method does not either provide the possibility of producing individual letters/figures without the use of punching or cutting.

An attempt to remedy some of these drawbacks has been made in DK patent No. 155 888 B (and the corresponding international patent application published as WO 88/08793) according to which a special plastisol reflex transfer is prepared by a method in which a conventional plastisol transfer is coated with an elastomer granulate of a type (e.g.

based on polyacryl amide) compatible with the plastisol ink and with the surface layer of a reflex transfer film, and the granulate is fused into the plastisol print by heating, following which a reflex transfer film cut to the contour of the pattern is positioned with the reflecting side inwards against the elastomer treated plastisol print and adhered to it by brief heating under a quite slight pressure. The thus formed plastisol reflex transfer may then be transferred to the desired substrate, in particular a textile, by conventional heat application. By this means it is possible to decorate textiles or other, preferably flexible, materials with patterns consisting of strongly light reflecting areas delimited by colored areas without having to cut out each light reflecting detail separately. However, manual work is still demanded for punching or cutting out the more regular pieces of reflex transfer film which are coupled onto the conventional plastisol transfer, and the light reflecting details must at least partially be delimited by colored areas.

US patent specification No. 4 102 562 discloses a transfer sheet material for forming retro-reflective graphic images on a substrate, said sheet material comprising a support sheet, a dense continuous monolayer of transparent microspheres partially and removably embedded in the support sheet to a depth averaging between about one-quarter and one-half of their diameter, a specularly reflective layer covering the surfaces of the microspheres which are exposed above the support sheet, and a transfer layer printed over the layer of microspheres in an imagewise pattern, which leaves areas of the layer of microspheres without pattern, the transfer layer being of a thickness such as to embed within it the surfaces of the microspheres that are exposed above the support sheet in the printed areas, and the transfer layer being adhereable to a substrate while retaining its imagewise pattern so that when the transfer layer is adhered to the substrate and the support sheet is stripped away, the transfer layer is left in place on the substrate, with the microspheres pulled from the support sheet and partially embedded in the transfer layer to form an image which is retroreflective over its full area. It is also stated that the transfer layer consists of a vinyl plastisol ink, and that the specularly reflective layer on the microspheres consists of a transparent dielectric mirror, but may also, if transparency is not necessary, consist of a vapor-coated metal, such as aluminum. It is further stated that a thin adhesion promoting layer comprising a polyurethane or a silane may be disposed between the specularly reflective layer and the transfer layer.

It has however been found that transfer layers of this kind, even when an adhesion promoting layer is applied between the specularly reflective layer and the transfer layer, do not ensure sufficient adhesion of the microspheres and do not adhere sufficiently to flexible substrates, such as textiles. Thus it is seen from example 1 of U.S. Pat. No. 4 102 562 that a reflecting image transferred onto garment from a transfer according to that patent specification lost 60% of its retro-flective intensity already after 5 washes in an automatic washer using hot water. Besides, images based on vinyl plastisol inks cannot stand dry cleaning. These drawbacks must be the reason why this kind of reflex transfer has not been put into practical use since it was invented in 1976.

According to the present invention we have found that it is possible to produce a transfer for decorating all kinds of textiles with images being extremely durable and capable of standing hot water wash and dry cleaning, using two-component colors and extenders developed especially for printing on difficult materials such as nylon, polyester, polyalkenes and siliconized surfaces. Such two-component colors and extenders have never before been used for producing transfers, as after setting they are not heat-activatable and will normally adhere so strongly to the support sheet (usually silicone or wax treated paper or polyethylene foil) as to be incapable of letting go again. At the same time they generally have poor adhesion to ordinary textiles, such as cotton and the like. We have also found that it is possible instead of the above mentioned two-component extender to use a polyester-based glue.

In the broadest aspect the transfer according to the invention comprises a support sheet having printed imagewise thereon one or more layers of two-component colors based on polyester resin and an isocyanate hardener and, if there is more than one color layer, on top thereof a layer of a corresponding two-component extender or a polyester-based glue, the color layer or the extender and color layers containing a polyester or polyamide based elastomer which has been applied to the color or extender layer while it was still wet, and fused into the color layer or the extender and color layers.

According to the invention such a transfer is produced by a method comprising the following steps:

(a) on a support sheet one or more layers of two-component color based on polyester resin and an isocyanate hardener are printed imagewise, (b) if more than one color is printed, each color layer is dried separately before the next layer is applied, and over all the layers a layer of a corresponding two-component extender or a polyester-based glue is printed, (c) while the single-color layer or the extender layer is still wet, a powder of a polyester or polyamide based elastomer is applied, and the powder is fused into the color layer or the extender and color layers.

It is extremely surprising that by using an elastomer powder which is normally used to improve the adhesion to textiles of thermoplastic transfer colors, such as conventional plastisol colors, in this special way according to the invention it is possible to modify setting color materials which have been developed for direct printing on difficult substrates so as to make them suited for transfers which can be heat-transferred to textiles in usual manner and provide extremely durable images. When printing a transfer it is also achieved that whereas by conventional transfer inks each color layer had to be dried at 160–180° C. for 15–25 seconds before application of the next layer, according to the present invention it suffices to dry each color layer at 50–60° C. for 15–25 seconds. Hereby any shrinkage or crumbling of the support sheet is avoided, enabling far more accurate and detailed printing.

According to this embodiment of the invention the support sheet is a conventional transfer carrier, e.g. a paper liner coated with wax or silicone or rapid-setting polyurethane.

A unique feature of the present invention thus comprises using as color and transfer layer in the transfer two-component colors and corresponding extenders based on polyester and isocyanate hardener, which are normally used for printing on difficult substrates. Examples of two-component colors and extenders usable for producing the transfer according to the invention include the color series "Visprox TCI 8700" and the transparent color series "Visprox TCI 8790" with corresponding extender and hardener "TCI 8700 Hardener", which are produced by Visprox B. V., Haarlem, Holland, and the color series "Nylobag NB" and Nylotex NX" with corresponding extenders and hardener "NB Catalyst", which are produced by Sericol Group Limited, Westwood Road, Broadstairs, Kent CT10 2Pa., England.

Another unique feature of the present invention is the use of a polyester or polyamide based elastomer powder which is applied to the still wet extender layer and fused into the extender and color layer. The fusing may e.g. be achieved by means of infra-red heating to 130–250° C. for 20–30 seconds. It has been found that the transfer based on two-component colors and extender without incorporation of this elastomer will soon loose its property for heat activation, but that the incorporation of the elastomer ensures the durability of the transfer, also by long-term storage. It has also been found that the elastomer significantly increases the adhesion between the transfer and textiles and simultaneously decreases the adhesion of the color and extender layer to the support sheet, allowing the latter to be stripped off after the transfer of the image to the textile. Examples of elastomer powders usable for production of the transfer according to the invention include the polyamide resin powder "FT-409 Transfer Powder", which is produced by Sericol Group Limited, Westwood Road, Broadstairs, Kent CT10 2PA, England, and the polyester resin powder (polydiol dicarboxylate) "Avabond 48E Powder", which is produced by Imperial Chemical House, Millbank, London SW1P 3JF, England.

It has been found that it is possible instead of the layer of two-component extender in the transfers of this invention to use a layer of a polyester-based glue such as the one sold by Unitika Sparklite Co., Ltd., Japan, as a transfer glue designated "TR Glue". The raw materials for this glue are:

(A) Crystalline saturated polyethylene terephthalate resin in powder form

| Melting point: | 110° C. |
| --- | --- |
| Brand name: | "Vylon GN - 915 P" |
| Manufacturer: | Toyobo |

(B) Saturated polyethylene terephthalate resin in liquid

| Composite: | 50% saturated polyester resin in block |
| --- | --- |
| | 50% cyclohexanone (solvent) |
| Viscosity: | 5000 centipoise at 20° C. |
| Brand name: | "Vylon RV - 15 CS" |
| Manufacturer: | Toyobo |

The transfer glue is prepared by adding A (25% by weight) to B (75% by weight) while stirring the glue, and the finished glue has a viscosity of 90 000 centipoise at 20° C. and a resin content of 62.5% by weight.

Such glues based on saturated polyester do not need a hardener for their function, but they take a somewhat longer time to dry than the two-component colors and extenders, for example 3–5 hours in a drying oven at 50–60° C. or up to several days at room temperature. They can be used without having a polyester or polyamide based elastomer powder fused into the layer, if no special demands for durability and washability of the decorated textiles are to be met. However, if the transfers are to be used for work clothes and/or the textiles decorated therewith must endure washing at temperatures above 50° C., it is advisable to cover the glue layer with an elastomer powder which is fused into the layer as described above.

According to the invention it has also been found that the said two-component colors and extenders in connection with the special treatment according to the invention are usable as transfer layer in reflecting transfers and provide solid anchoring of the reflecting glass beads in the layer and a firm adhesion to the substrate onto which the layer is transferred, so that the image transferred stands both wash and dry cleaning. Here, too, a polyester-based glue may be used instead of the two-component extender. In this connection it has also been found possible by use of a release agent in a simple printing process to achieve that the produced transfer comprises both reflecting and non-reflecting areas.

According to the invention it is thus possible by simple graphic processes to produce transfers for decoration of textiles with images comprising light reflecting areas of arbitrary configuration and color and in arbitrary combination with colored non-reflecting areas, said images being durable and preserving their reflective intensity both in wash and dry cleaning.

This is achieved by the transfer according to the invention which comprises (a) a support sheet with a monolayer of transparent microspheres being partially embedded in the support sheet to a depth of between about one-quarter and one-half of their diameter, (b) a specularly reflecting layer covering such parts of the surfaces of the microspheres as are exposed above the support sheet, (c) optionally a coating of a release agent printed imagewise on top of the layer of microspheres at places where a non-reflecting image is desired, (d) one or more coatings of two-component colors based on polyester resin and isocyanate hardener as well as various pigments printed imagewise on top of the layer of microspheres and release agent, if any, (e) a transfer layer of an extender corresponding to the two-component colors, but without pigment, or of a polyester-based glue printed imagewise on top of the layer of microspheres and color in such thickness that the exposed parts of the glass beads above the support sheet are completely embedded therein, (f) the extender and color layers containing a polyester or polyamide based elastomer which has been applied while the extender layer was still wet, and fused into the extender and color layers.

The method according to the invention for producing such a transfer comprises the following steps:

(a) a support sheet with a monolayer of transparent microspheres being partially embedded in the support sheet to a depth of between about one-quarter and one-half of their diameter, is coated with a specularly reflecting layer covering the surfaces of the microspheres that are exposed above the support sheet, (b) if parts of the transferred image are not to be reflecting, a coating of a release agent is printed imagewise on top of the corresponding parts of the layer of microspheres, (c) one or more coatings of two-component colors based on polyester resin and an isocyanate hardener as well as various pigments are printed imagewise pattern on the layer of microspheres and optionally release agent, and each color coating is dried, (d) a transfer layer of an extender corresponding to the two-component colors, but without pigment, or of a polyester-based glue is printed on the layer of microspheres and color in such thickness that the exposed parts of the glass beads above the support sheet are completely embedded therein, (e) while still wet the extender layer is coated with a powder of a polyester or polyamide based elastomer, and the powder is fused into the extender and color layers.

The support sheet with a monolayer of transparent microspheres used in the present embodiment of the invention may be a glass bead release sheet of the kind produced in the first step of the production process of the known reflex transfer foils of the glass bead type. The carrier may e.g. by a paper liner or a polyester foil provided with a coating of thermoplastic material, e.g. polyethylene, being sufficiently thick to be capable of embedding the glass beads to a depth averaging between one-quarter and one-half of their diameter. Advantageously, the thermoplastic material is coated with an agent, such as silicone, which controls the adhesion of the glass beads to the material. Then a monolayer of glass beads is applied by heating of the support sheet to soften the thermoplastic material so as to ensure embedding of the beads therein.

The specularly reflecting layer which is applied to the exposed parts of the glass beads may in known manner consist of a transparent dielectric mirror or, if transparency is not needed, metal, such as aluminum. If the reflective intensity is of no decisive importance the glass beads do not need to form a dense continuous layer, but may be applied to the support sheet in reduced density, so that the color or colors in the finished image are visible between the beads, even if the beads are coated with aluminum.

A special feature of the present invention is the optional application of a coating of a release agent on parts of the layer of glass beads before the application of the color and extender layer. This release agent must be of such nature that the glass beads applied thereto let go more easily of the color and extender layer than of the support sheet with optionally applied silicone coating. Hereby it is achieved that when the transfer-image has been transferred to a substrate by heat activation the glass beads when peeling off the support sheet will remain adhered in the color and extender layer except in such areas where they have been coated with a release agent. The release agent may e.g. be a silicone or a fast setting polyurethane. A suitable release agent is a silicone of the type "Dispersion CAS 4A' 75%" sold by Rhone Poulenc.

One of the significant advantages of this embodiment of the invention is that it is possible by imagewise printing with release agent to decide which parts of the transfer pattern must be reflecting and then by imagewise printing with several colors of the above stated kind in each separate printing process to form a multicolor transfer pattern. After each of these printing processes the applied coating is dried in air at from room temperature up to max. about 60° C. for from 5 min to 10 seconds, preferably 50–60° C. for 15–25 seconds. By another imagewise printing process the color coatings and any further areas which it is desired should be colorlessly reflecting are coated with a layer of extender, and while this layer is still wet it is covered by an elastomer powder of the previously stated kind, and the powder is fused into the extender and color layers by heating to 130–250° C. for 10–40 seconds, preferably to about 180° C. for about 20 seconds. Thus, merely by repeating simple graphic printing processes it is possible to produce transfers with which, by conventional application of heat, a multi-colored image having reflecting and nonreflecting areas in any desired configuration may be transferred.

If, however, an image having only one color is desired the extender or glue layer may optionally be left out and the color be used also as binder and transfer layer, the color being applied in a sufficiently thick layer for the exposed parts of the glass beads above the support layer to be completely embedded therein, and, while the color layer is still wet, applying the elastomer powder and fusing it into the color layer as stated above.

On the other hand, it is also possible to leave out the color coatings and the optional coating of release agent printing the layer of two-component extender or polyester-based glue imagewise directly on the layer of microspheres so that the transfer image only comprises uncolored reflecting areas.

Instead of using the usual printing processes, e.g. silk screen printing, it is also possible to use a color copier with two-component toner for applying the color coatings. When using several colors all the colors can thus be applied in one working operation. In any event the color coating must subsequently be covered with a layer of colourless two-component extender which while still wet is covered with an elastomer powder of the previously stated kind, which is fused into the layer. A suitable color copier could e.g. be "Canon Color Laser Copier 500" which operates with indirect electrostatic copying in full color or single color generated by toner projection with two-component toners in the colors yellow, magenta, cyan and black or one of these and with fixation by passage of hot rollers. This laser color copier is produced by Canon Inc., 2-7-1 Nishi-Shinjuku, ShinJuku-ku, Tokyo 163, Japan.

Transfers according to the invention may advantageously be produced in large scale on so-called roll to roll transfer machines.

Such machines normally operate with a silicone paper provided in large rolls with a width of as much as 90 cm. The paper passes continuously from one silk screen printing machine with subsequent drying oven to another. Thus, if four stations are available 4-colored transfers may be produced. The transfer is cut from the finished roll.

In the reflex-transfer embodiment the reflex-liner in the roll format is used as support, and the last printing station is used for printing the extender layer, which subsequently in a wet state passes through a powder application unit which applies the elastomer powder. Fusing is subsequently performed in an infra-red drying oven. Times and temperatures are as in normal transfer production.

It is also possible to transfer the transfer pattern continuously from a thus produced transfer roll to lengths of textile. Use can be made of known technology from the so-called sublistatic method in which patterns are transferred in a continuous calander-process from a colored paper to lengths of textile by means of heat and pressure in a continuous process. The transfer machine can be adjusted with temperature, pressure, time corresponding to the normal application conditions for transfers of the present type.

Hereby it is possible to produce reflecting patterns which could not be obtained rationally by separate applications of reflex transfers. Consequently new design possibilities may be offered to the clothing industry.

BRIEF DESCRIPTION OF THE DRAWINGS

The support sheet used was a sheet material produced as described in US patent specification No. 4 102 562, column 3, line 33–53 and comprising the parts 1, 2, 3 and 4 shown in the attached drawing. The sheet material comprises a Kraft-paper base sheet 1 covered with a thermoplastic layer 2 of low-density polyethylene, in which transparent glass microspheres 3 have been embedded by heating, the microspheres having a refractive index of approx. 1.92 and diameters in the range of 70–100 μm. On the parts of the microspheres 3 which are not embedded in the polyethylene layer 2, they are provided with a transparent dielectric mirror 4 consisting of a vapor-coated layer of cryolite and on top of this layer a vapour-coated layer of zinc sulfide, each layer having an optical thickness (the product of physical thickness and refractive index) of one-quarter the wave length of white light, i.e. approx. 140 nm.

In a silk screen printing machine the following layers are printed in an imagewise inverted fashion on this support sheet:

1. On such areas of the support sheet intended to give a non-reflecting transfer-image is printed a clear varnish layer consisting of rapid-setting polyurethane, and this layer is dried in an infra-red jet-drying oven at approx. 60° C. for 60 seconds, whereafter the polyurethane is no longer heat-activatable, but forms a solid bond with the support sheet and binds the glass beads thereto. Simultaneously the varnish layer has a hard and smooth surface which does not react with the subsequent two-component colors and extender, and it consequently acts as a release layer towards these layers.

2. On top of the glass beads and the release layer the desired color layers, denoted by 5 in the drawing, are then, each in a separate working operation, printed with two-component colors selected from the color series "Nylotex NX" admixed with 1–5% (v/v) hardener "NB Catalyst" produced by Sericol Group Limited. After each printing the color layer is dried in an infra-red jet-drying oven at approx. 60° C. for approx. 20 seconds.

Over all these color layers and optionally beyond them, if the transfer image is also to comprise uncolored reflecting areas, is printed a layer of "Nylotex NX" extender base, corresponding to the colors, but being without pigmentation and consequently transparent, in a thickness which completely embeds the exposed parts of the glass beads (40–75 μm after drying) denoted by 6 in the drawing.

While the extender layer is still wet it is covered with a powder of a polydiole dicarboxylate elastomer, "Avabond 48E Powder", produced by Imperial Chemical House, denoted by 7 in the drawing. The powder sinks into the extender layer and by immediately succeeding heating in an infra-red oven at 180° C. for 20 seconds the elastomer powder is fused with the extender and color layers. The result is a finished transfer according to the invention.

The transfer image is transferred to a textile of polyester/cotton-mixture by positioning the transfer with the powder treated extender layer against the textile and introducing the combination in a heat press exerting a pressure of 310 kPa at a temperature of 160° C. for 12 seconds. After cooling the support sheet is peeled off whereby the glass microspheres remain on the pattern transferred where they are anchored in the color and extender layers, whereas they adhere to the support sheet at such places where a release layer has been interposed and on the excess part around the transfer pattern.

The transferred image shows a design consisting of non-reflecting areas in the desired colors and also reflecting areas where the glass microspheres provide a strong retro-reflex in darkness, but in daylight permit the light to shine through and reproduce the underlying colors with a glittering glow. The image adheres extremely well to the textile and endures both hot water wash (95° C.) and dry cleaning with dichloroethylene and similar agents.

We claim:

1. A transfer for placing a retroreflective article on a substrate, which transfer comprises:
   (a) a support sheet;
   (b) a monolayer of transparent microspheres embedded about one-fourth to about one-half their diameter in the support sheet;
   (c) a specularly reflecting layer disposed on the portion of the microspheres that protrudes from the support sheet; and
   (d) an imagewise coating applied over the specularly reflecting layer, the imagewise coating being based on a polyester resin and an isocyanate.

2. The transfer of claim 1, wherein the specularly reflecting layer is a transparent dielectric mirror and the imagewise coating is colored.

3. The transfer of claim 2, further comprising an extender layer that covers at least the imagewise coating, the extender layer being based on a polyester resin and an isocyanate.

4. The transfer of claim 3, further comprising a polyester or polyamide based elastomer that is fused into the extender layer.

5. The transfer of claim 1, further comprising a release agent disposed between the specularly reflecting layer and the imagewise coating, the release agent allowing the microspheres to remain in the support sheet in areas where the release agent is disposed after the support sheet is separated from the transfer.

6. The transfer of claim 5, wherein the specularly reflecting layer is a metal layer and the imagewise coating is colored, and when the support sheet is separated from the transfer to form a retroreflective article, the color of the imagewise coating is visible from the front side of the retroreflective article in areas corresponding to where the release agent was disposed.

7. The transfer of claim 5, wherein the imagewise coating is colored, and the transfer further comprises an extender layer that covers the imagewise coating and the specularly reflecting layer in such thickness that the microspheres are embedded therein.

8. The transfer of claim 7, wherein the extender layer is based on a polyester resin and an isocyanate hardener or is based on a polyester based glue.

9. The transfer of claim 8, wherein the extender layer is based on a polyester resin and an isocyanate hardener.

10. The transfer of claim 7, further comprising a second imagewise colored coating applied on the specularly reflecting layer, the extender layer also covering the second imagewise colored coating.

11. The transfer of claim 10, wherein the extender layer is based on a polyester and an isocyanate.

12. The transfer of claim 11, further comprising a polyester or polyamide based elastomer that is fused into the extender layer.

* * * * *